US00RE50043E

(19) United States
(12) Reissued Patent
Gonser, Jr. et al.

(10) Patent Number: US RE50,043 E
(45) Date of Reissued Patent: Jul. 16, 2024

(54) METHOD FOR ASSOCIATING THIRD PARTY CONTENT WITH ONLINE DOCUMENT SIGNING

(71) Applicant: DocuSign, Inc., San Francisco, CA (US)

(72) Inventors: Thomas H. Gonser, Jr., Bellevue, WA (US); Donald G. Peterson, Kirkland, WA (US)

(73) Assignee: DOCUSIGN, INC., San Francisco, CA (US)

(21) Appl. No.: 16/864,063

(22) Filed: Apr. 30, 2020

Related U.S. Patent Documents

Reissue of:
(64) Patent No.: 9,971,754
Issued: May 15, 2018
Appl. No.: 15/006,833
Filed: Jan. 26, 2016

U.S. Applications:
(63) Continuation of application No. 13/548,669, filed on Jul. 13, 2012, now Pat. No. 9,268,758.

(60) Provisional application No. 61/507,910, filed on Jul. 14, 2011.

(51) Int. Cl.
*G06F 40/174* (2020.01)
*G06Q 50/18* (2012.01)

(52) U.S. Cl.
CPC ..... *G06F 40/174* (2020.01); *G06Q 50/18* (2013.01)

(58) Field of Classification Search
CPC ..... G06F 21/64; G06F 40/174; G06Q 50/18
See application file for complete search history.

(56) References Cited

U.S. PATENT DOCUMENTS 5,040,142 A 8/1991 Mori et al.
5,220,675 A 6/1993 Padawer et al.
5,222,138 A 6/1993 Balabon et al.
5,337,360 A 8/1994 Fischer
(Continued)

FOREIGN PATENT DOCUMENTS

AU 2012283812 B2 12/2016
CN 101136046 A 3/2008
(Continued)

OTHER PUBLICATIONS

"Elynx Adds Workflow Management to Electronic Document Platform—new Workflow Capabilities Provide for Enhanced Electronic Loan Processing", [Online]. Retrieved from the Internet: <URL: http://www.elynx.com/news/view/82, (Jan. 2009), 2 pgs.
(Continued)

*Primary Examiner* — Matthew E Heneghan
(74) *Attorney, Agent, or Firm* — Shumaker & Sieffert, P.A.

(57) ABSTRACT

Techniques for electronic signature process management are described. Some embodiments provide an electronic signature service ("ESS") configured to associate third-party content with electronic signature documents by way of dynamic form fields. A dynamic form field is associated with a data store and an electronic signature document. The ESS may automatically populate the dynamic form field with data obtained from the associated data store. If a signer changes the data of the dynamic form field, the ESS may write back the changed data to the data store.

12 Claims, 5 Drawing Sheets

(56) References Cited

U.S. PATENT DOCUMENTS 5,390,247 A 2/1995 Fischer
5,465,299 A 11/1995 Matsumoto et al.
5,544,255 A 8/1996 Smithies et al.
5,553,145 A 9/1996 Micali
5,615,268 A 3/1997 Bisbee et al.
5,629,982 A 5/1997 Micali
5,689,567 A 11/1997 Miyauchi
5,748,738 A 5/1998 Bisbee et al.
5,813,009 A 9/1998 Johnson et al.
5,832,499 A 11/1998 Gustman
5,872,848 A 2/1999 Romney et al.
5,898,156 A 4/1999 Wilfong
6,021,202 A 2/2000 Anderson et al.
6,067,531 A 5/2000 Hoyt et al.
6,085,322 A 7/2000 Romney et al.
6,092,080 A 7/2000 Gustman
6,119,229 A 9/2000 Martinez et al.
6,128,740 A 10/2000 Curry et al.
6,161,139 A 12/2000 Win et al.
6,185,587 B1 2/2001 Bernardo et al.
6,185,683 B1 2/2001 Ginter et al.
6,199,052 B1 3/2001 Mitty et al.
6,210,276 B1 4/2001 Mullins
6,237,096 B1 5/2001 Bisbee et al.
6,282,552 B1 8/2001 Thompson et al.
6,289,460 B1 9/2001 Hajmiragha
6,321,333 B1 11/2001 Murray
6,327,656 B2 12/2001 Zabetian
6,367,010 B1 4/2002 Venkatram et al.
6,367,013 B1 4/2002 Bisbee et al.
6,446,115 B2 9/2002 Powers
6,470,448 B1 10/2002 Kuroda et al.
6,584,466 B1 6/2003 Serbinis et al.
6,615,348 B1 9/2003 Gibbs
6,658,403 B1 12/2003 Kuroda et al.
6,671,805 B1 12/2003 Brown et al.
6,728,762 B1 4/2004 Estrada et al.
6,751,632 B1 6/2004 Petrogiannis
6,754,829 B1 6/2004 Butt et al.
6,796,489 B2 9/2004 Slater et al.
6,807,633 B1 10/2004 Pavlik
6,829,635 B1 12/2004 Townshend
6,912,660 B1 6/2005 Petrogiannis
6,931,420 B1 8/2005 Silvester et al.
6,938,157 B2 8/2005 Kaplan
6,944,648 B2 9/2005 Cochran et al.
6,947,911 B1 9/2005 Moritsu et al.
6,959,382 B1 10/2005 Kinnis et al.
6,961,854 B2 11/2005 Serret-avila et al.
6,973,569 B1 12/2005 Anderson et al.
6,990,684 B2 1/2006 Futamura et al.
7,039,805 B1 5/2006 Messing
7,059,516 B2 6/2006 Matsuyama et al.
7,069,443 B2 6/2006 Berringer et al.
7,093,130 B1 8/2006 Kobayashi et al.
7,100,045 B2 8/2006 Yamada et al.
7,103,778 B2 9/2006 Kon et al.
7,162,635 B2 1/2007 Bisbee et al.
7,167,844 B1 1/2007 Leong et al.
7,197,644 B2 3/2007 Brewington
7,237,114 B1 6/2007 Rosenberg
7,340,608 B2 3/2008 Laurie et al.
7,360,079 B2 4/2008 Wall
7,395,436 B1 7/2008 Nemovicher
7,424,543 B2 9/2008 Rice, III
7,437,421 B2 10/2008 Bhogal et al.
7,523,315 B2 4/2009 Hougaard et al.
7,533,268 B1 5/2009 Catorcini et al.
7,554,576 B2 6/2009 Erol
7,562,053 B2 7/2009 Twining et al.
7,568,101 B1 7/2009 Catorcini et al.
7,568,104 B2 7/2009 Berryman et al.
7,581,105 B2 8/2009 Dietl
7,644,351 B1 * 1/2010 Portnoy ..... G06F 17/243 715/224
7,657,832 B1 2/2010 Lin
7,660,863 B2 2/2010 De Boursetty et al.
7,788,259 B2 8/2010 Patterson et al.
7,934,098 B1 4/2011 Hahn et al.
7,953,977 B2 5/2011 Maruyama et al.
8,103,867 B2 1/2012 Spitz
8,132,013 B2 3/2012 Meier
8,286,071 B1 10/2012 Zimmerman et al.
8,588,483 B2 11/2013 Hicks et al.
8,612,349 B1 12/2013 Ledder et al.
9,268,758 B2 2/2016 Gonser, Jr. et al.
9,971,754 B2 5/2018 Gonser, Jr. et al.
2001/0018739 A1 8/2001 Anderson et al.
2001/0034835 A1 10/2001 Smith
2002/0004800 A1 1/2002 Kikuta et al.
2002/0019937 A1 2/2002 Edstrom et al.
2002/0026427 A1 2/2002 Kon et al.
2002/0026582 A1 2/2002 Futamura et al.
2002/0040431 A1 4/2002 Kato et al.
2002/0055945 A1 * 5/2002 Endress ..... G06F 17/243 715/255
2002/0069179 A1 6/2002 Slater et al.
2002/0069358 A1 6/2002 Silvester
2002/0082857 A1 * 6/2002 Skordin ..... G06F 17/243 705/1.1
2002/0129056 A1 9/2002 Conant et al.
2002/0133470 A1 * 9/2002 Gruber ..... G06Q 10/087 705/76
2002/0138445 A1 9/2002 Laage et al.
2002/0143711 A1 10/2002 Nassiri
2002/0162000 A1 10/2002 Benzler
2002/0178187 A1 11/2002 Rasmussen et al.
2002/0184485 A1 12/2002 Dray, Jr. et al.
2002/0194219 A1 12/2002 Bradley et al.
2002/0196478 A1 12/2002 Struble
2003/0023625 A1 * 1/2003 Thomason ..... G06F 17/243 715/225
2003/0048301 A1 3/2003 Menninger
2003/0051016 A1 3/2003 Miyoshi et al.
2003/0078880 A1 4/2003 Alley et al.
2003/0120553 A1 6/2003 Williams
2003/0120930 A1 6/2003 Simpson et al.
2003/0131073 A1 7/2003 Lucovsky et al.
2003/0140252 A1 7/2003 Lafon et al.
2003/0217275 A1 11/2003 Bentley et al.
2004/0054606 A1 3/2004 Broerman
2004/0078337 A1 4/2004 King et al.
2004/0107352 A1 6/2004 Yui et al.
2004/0117627 A1 6/2004 Brewington
2004/0133493 A1 7/2004 Ford et al.
2004/0162833 A1 * 8/2004 Jones ..... G06F 40/137
2004/0181756 A1 9/2004 Berringer et al.
2004/0205534 A1 * 10/2004 Koelle ..... G06F 17/243 715/222
2004/0225884 A1 11/2004 Lorenzini et al.
2004/0230891 A1 11/2004 Pravetz et al.
2004/0250070 A1 12/2004 Wong
2004/0255114 A1 12/2004 Lee et al.
2004/0255127 A1 12/2004 Arnouse
2005/0033811 A1 2/2005 Bhogal et al.
2005/0049903 A1 3/2005 Raja
2005/0076215 A1 4/2005 Dryer
2005/0091143 A1 4/2005 Schmidt et al.
2005/0120217 A1 6/2005 Fifield et al.
2005/0165626 A1 7/2005 Karpf
2005/0182684 A1 8/2005 Dawson et al.
2005/0182956 A1 8/2005 Ginter et al.
2005/0192908 A1 9/2005 Jorimann et al.
2005/0231738 A1 10/2005 Huff et al.
2006/0020592 A1 * 1/2006 Gee ..... G06F 17/243
2006/0047600 A1 3/2006 Bodenheim et al.
2006/0161780 A1 7/2006 Berryman et al.
2006/0161781 A1 7/2006 Rice et al.
2006/0174199 A1 8/2006 Soltis et al.
2006/0205476 A1 9/2006 Jubinville
2006/0259440 A1 11/2006 Leake et al.
2006/0261545 A1 11/2006 Rogers
2006/0294152 A1 12/2006 Kawabe et al.
2007/0026927 A1 2/2007 Yaldoo et al.

(56) References Cited

U.S. PATENT DOCUMENTS

| | | | | |
|---|---|---|---|---|
| 2007/0061578 | A1* | 3/2007 | Dhalla | G06F 40/174 713/176 |
| 2007/0079139 | A1 | 4/2007 | Kim | |
| 2007/0088958 | A1 | 4/2007 | Qa'im-maqami | |
| 2007/0118732 | A1 | 5/2007 | Whitmore | |
| 2007/0130186 | A1 | 6/2007 | Ramsey et al. | |
| 2007/0136361 | A1 | 6/2007 | Lee et al. | |
| 2007/0143085 | A1 | 6/2007 | Kimmel | |
| 2007/0165865 | A1 | 7/2007 | Talvitie | |
| 2007/0198533 | A1 | 8/2007 | Foygel et al. | |
| 2007/0208944 | A1 | 9/2007 | Pavlicic | |
| 2007/0220260 | A1 | 9/2007 | King | |
| 2007/0271592 | A1 | 11/2007 | Noda et al. | |
| 2007/0289022 | A1 | 12/2007 | Wittkotter | |
| 2008/0016357 | A1 | 1/2008 | Suarez | |
| 2008/0034213 | A1 | 2/2008 | Boemker et al. | |
| 2008/0052520 | A1 | 2/2008 | Lee et al. | |
| 2008/0055945 | A1 | 3/2008 | Chan et al. | |
| 2008/0097777 | A1 | 4/2008 | Rielo | |
| 2008/0141033 | A1 | 6/2008 | Ginter et al. | |
| 2008/0209313 | A1 | 8/2008 | Gonser | |
| 2008/0209516 | A1 | 8/2008 | Nassiri | |
| 2008/0216147 | A1 | 9/2008 | Duffy | |
| 2008/0235577 | A1 | 9/2008 | Veluchamy et al. | |
| 2008/0260287 | A1 | 10/2008 | Berryman et al. | |
| 2008/0301010 | A1 | 12/2008 | Klim et al. | |
| 2008/0307298 | A1* | 12/2008 | Matveief | G06F 17/243 715/224 |
| 2008/0313723 | A1 | 12/2008 | Naono et al. | |
| 2009/0024912 | A1 | 1/2009 | Mccabe et al. | |
| 2009/0025087 | A1 | 1/2009 | Peirson, Jr. et al. | |
| 2009/0044019 | A1 | 2/2009 | Lee et al. | |
| 2009/0083618 | A1* | 3/2009 | Campbell | G06F 40/174 715/226 |
| 2009/0099881 | A1 | 4/2009 | Hanna et al. | |
| 2009/0132351 | A1 | 5/2009 | Gibson | |
| 2009/0138730 | A1 | 5/2009 | Cook et al. | |
| 2009/0145958 | A1 | 6/2009 | Stoutenburg et al. | |
| 2009/0185241 | A1 | 7/2009 | Nepomniachtchi | |
| 2009/0268903 | A1 | 10/2009 | Bojinov et al. | |
| 2009/0292786 | A1 | 11/2009 | Mccabe et al. | |
| 2010/0088364 | A1 | 4/2010 | Carter et al. | |
| 2010/0106608 | A1* | 4/2010 | Menendez | G06Q 20/204 705/26.1 |
| 2010/0122094 | A1 | 5/2010 | Shima | |
| 2010/0153011 | A1 | 6/2010 | Obrea et al. | |
| 2010/0217987 | A1 | 8/2010 | Shevadex | |
| 2010/0235727 | A1 | 9/2010 | Ashton et al. | |
| 2010/0274863 | A1 | 10/2010 | Foygel et al. | |
| 2010/0287260 | A1 | 11/2010 | Peterson et al. | |
| 2010/0293094 | A1 | 11/2010 | Kolkowitz et al. | |
| 2011/0093769 | A1 | 4/2011 | Dunn et al. | |
| 2011/0093807 | A1* | 4/2011 | Dunn | G06F 17/243 715/780 |
| 2011/0119165 | A1 | 5/2011 | Zee | |
| 2011/0126022 | A1 | 5/2011 | Sieberer | |
| 2011/0225485 | A1* | 9/2011 | Schnitt | G06F 17/243 715/222 |
| 2011/0238510 | A1 | 9/2011 | Rowen et al. | |
| 2011/0264907 | A1 | 10/2011 | Betz et al. | |
| 2011/0314371 | A1 | 12/2011 | Peterson et al. | |
| 2012/0180135 | A1 | 7/2012 | Hodges et al. | |
| 2012/0209970 | A1 | 8/2012 | Scipioni et al. | |
| 2012/0271882 | A1 | 10/2012 | Sachdeva et al. | |
| 2012/0304265 | A1 | 11/2012 | Richter et al. | |
| 2013/0019156 | A1 | 1/2013 | Gonser | |
| 2013/0019289 | A1 | 1/2013 | Gonser et al. | |
| 2013/0050512 | A1 | 2/2013 | Gonser et al. | |
| 2013/0067243 | A1 | 3/2013 | Tamayo-Rios et al. | |
| 2013/0159720 | A1 | 6/2013 | Gonser et al. | |
| 2013/0179676 | A1 | 7/2013 | Hamid | |
| 2013/0254111 | A1 | 9/2013 | Gonser et al. | |
| 2013/0263283 | A1 | 10/2013 | Peterson et al. | |
| 2014/0019761 | A1 | 1/2014 | Shapiro | |

FOREIGN PATENT DOCUMENTS

| | | | |
|---|---|---|---|
| CN | 101299256 | | 11/2008 |
| CN | 101299256 | A | 11/2008 |
| CN | 101395599 | A | 3/2009 |
| CN | 103959281 | A | 7/2014 |
| EP | 1238321 | | 6/2001 |
| EP | 1238321 | A1 | 9/2002 |
| JP | 2000048072 | A | 2/2000 |
| JP | 2003271529 | | 9/2003 |
| JP | 2003271529 | A | 9/2003 |
| JP | 2004-246903 | A | 9/2004 |
| JP | 2005267438 | | 9/2005 |
| JP | 2005267438 | A | 9/2005 |
| JP | 2008117258 | A | 5/2008 |
| JP | 2008225527 | A | 9/2008 |
| KR | 20000049674 | A | 8/2000 |
| KR | 1020020092595 | A | 12/2002 |
| KR | 1020070059931 | | 6/2007 |
| KR | 1020070059931 | A | 6/2007 |
| KR | 100929488 | B1 | 12/2009 |
| KR | 20090122657 | A | 12/2009 |
| RU | 2400811 | C2 | 11/2005 |
| RU | 2291491 | C2 | 1/2007 |
| RU | 2300844 | C2 | 6/2007 |
| RU | 2291491 | C2 | 10/2007 |
| RU | 2300844 | C2 | 6/2010 |
| RU | 2400811 | C2 | 9/2010 |
| WO | 01042885 | A1 | 6/2001 |
| WO | 2003091834 | A2 | 11/2003 |
| WO | WO-03091834 | A2 | 11/2003 |
| WO | 2007075235 | A1 | 7/2007 |
| WO | WO-2007075235 | A1 | 7/2007 |
| WO | 2008124627 | A1 | 10/2008 |
| WO | WO-2008124627 | A1 | 10/2008 |
| WO | 2009012478 | A3 | 1/2009 |
| WO | WO-2009012478 | A3 | 1/2009 |
| WO | 2010105262 | A1 | 9/2010 |
| WO | WO-2010105262 | A1 | 9/2010 |
| WO | 2010151630 | A2 | 12/2010 |
| WO | WO-2010151630 | A2 | 12/2010 |
| WO | 2013010174 | A3 | 1/2013 |
| WO | WO-2013010174 | | 1/2013 |

OTHER PUBLICATIONS

Borozdin, "DocuSign Connect Service Guide," DocuSign, Inc., pp. 1-9, 2008.

Brown, "Digital Signatures: Can They Be Accepted As Legal Signatures in EID?", Dec. 1993, ACM, p. 86-92.

Herzberg et al., "SurfN'Sign: Client Signatures on Web Documents", 1998, IEEE, vol. 37 Issue 1, p. 61-71.

Kwok et al., "An Automatic Electronic Contract Document Signing System in a Secure Environment", 2005, IEEE, p. 497-502.

Laurens Leurs; The history of PDF; Feb. 14, 2010; Prepressure.com; pp. 1-12.

Prosecution History from U.S. Appl. No. 13/548,669, now U.S. Pat. No. 9,268,758, dated Dec. 24, 2014 through Oct. 19, 2015, 51 pp.

Prosecution History from U.S. Appl. No. 15/006,833, now U.S. Pat. No. 9,971,754, dated Jan. 27, 2016 through Jan. 12, 2018, 31 pp.

Su et al., "Signature-In-Signature Verification Via a Secure Simple Network Protocol", 2010, IEEE, p. 1-4.

Wheeler et al., "DocuSign Unveils new Scalable Product and Support Offerings of Electronic Signature and Electronic Contract Execution," DocuSign The Fastest Way to Get a Signature, 2 pp., Jan. 2008.

Zefferer et al., "An Electronic-Signature Based Circular Resolution Database System," Mar. 2010, ACM, p. 1840-1845.

"U.S. Appl. No. 13/548,669, Final Office Action dated Apr. 8, 2015", 13 pgs.

"U.S. Appl. No. 13/548,669, Non Final Office Action dated Dec. 24, 2014", 11 pgs.

"U.S. Appl. No. 13/548,669, Notice of Allowance dated Oct. 19, 2015", 6 pgs.

(56) References Cited

OTHER PUBLICATIONS

"U.S. Appl. No. 13/548,669, Response filed Mar. 24, 2015 to Non Final Office Action dated Dec. 24, 2014", 9 pgs.
"Australian Application Serial No. 2012283812, First Examiners Report dated Aug. 1, 2016", 3 pgs.
"Australian Application Serial No. 2012283812, Response filed Nov. 10, 2016 to First Examiners Report dated Aug. 1, 2016", 18 pgs.
"Chinese Application Serial No. 201280044907.7, Office Action dated Jun. 30, 2016", W/English Translation, 16 pgs.
"Chinese Application Serial No. 201280044907.7, Office Action dated Nov. 4, 2015", w/English Translation, 21 pgs.
"Chinese Application Serial No. 201280044907.7, Office Action dated Dec. 22, 2016", W/English Translation, 12 pgs.
"Chinese Application Serial No. 201280044907.7, Response filed Mar. 1, 2017 to Office Action dated Dec. 22, 2016", w/English Claims, 13 pgs.
"Chinese Application Serial No. 201280044907.7, Response filed Mar. 17, 2016 to Office Action dated Nov. 4, 2015", w/English Claims, 14 pgs.
"Chinese Application Serial No. 201280044907.7, Response filed Sep. 8, 2016 to Office Action dated Jun. 30, 2016", w/English Claims, 13 pgs.
"eLynx Adds Workftow Management to Electronic Document Platform—new Workflow Capabilities Provide for Enhanced Electronic Loan Processing", [Online]. Retrieved from the Internet: <URL: http://www.elynx.com/news/view/82, (Jan. 2009), 2 pgs.
"European Application Serial No. 12811171.3, Extended European Search Report dated Jun. 3, 2016", 9 pgs.
"European Application Serial No. 12811171.3, Office Action dated Feb. 21, 2014", 3 pgs.
"European Application Serial No. 12811171.3, Response filed Dec. 23, 2016 to Extended European Search Report dated Jun. 3, 2016", 15 pgs.
"International Application Serial No. PCT/US2012/046938, International Preliminary Report on Patentability dated Jan. 23, 2014", 7 pgs.
"International Application Serial No. PCT/US2012/046938, International Search Report dated Jan. 25, 2013", 3 pgs.
"International Application Serial No. PCT/US2012/046938, Written Opinion dated Jan. 25, 2013", 6 pgs.
"Japanese Application Serial No. 2014-520409, Examiners Decision of Final Refusal dated Jul. 12, 2016", W/ English Translation, 4 pgs.
"Japanese Application Serial No. 2014-520409, Office Action dated Dec. 1, 2015", W/ English Translation, 9 pgs.
"Japanese Application Serial No. 2014-520409, Response filed Mar. 23, 2016 to Office Action dated Dec. 1, 2015", w/English Claims, 14 pgs.
"Singapore Application Serial No. 2014002836, Response filed Dec. 17, 2015 to Written Opinion dated Jul. 16, 2015", 7 pgs.
"Singapore Application Serial No. 2014002836, Search Report dated Jun. 23, 2015", 3 pgs.
"Singapore Application Serial No. 2014002836, Substantive Examination Report dated Jun. 23, 2016", 6 pgs.
"Singapore Application Serial No. 2014002836, Written Opinion dated Jul. 16, 2015", 4 pgs.
Borozdin, "DocuSign Connect Service Guide", DocuSign, Inc, (2008), 1-9.
Brown, et al., "Digital Signatures: Can They Be Accepted as Legal Signatures in EID?", ACM, (Dec. 1993), 86-92.
Harold, Elliotte Rusty, "XML Bible", IDG Books Worldwide, Inc.,, (1999), 191-192.
Herzberg, et al., "Surf'N'Sign: Client Signatures on Web Documents", IEEE, vol. 37 Issue 1,, (1998), 61-71.
Kamara, et al., "Cryptographic Cloud Storage", Published in "Financial Cryptography and Data Security" Springer,, (2010), 136-149.
Kwok, et al., "An Automatic Electronic Contract Document Signing System in a Secure Environment", IEEE, (2005), 497-502.
Laurens, Leurs, "The history of PDF", Prepressure.com, (Feb. 14, 2010), 1-12.
Su, et al., "Signature-In-Signature Verification via a Secure Simple Network Protocol", IEEE, (2010), 1-4.
Wheeler, et al., "DocuSign Unveils new Scalable Product and Support Offerings of Electronic Signature and Electronic Contract Execution", DocuSign the Fastest Way to Get a Signature, (Jan. 2008), 1 pg.
Zefferer, et al., "An Electronic-Signature Based Circular Resolution Database System", ACM, (Mar. 2010), 1840-1845.

* cited by examiner

METHOD FOR ASSOCIATING THIRD PARTY CONTENT WITH ONLINE DOCUMENT SIGNING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM

This application *is a reissue of U.S. Pat. No. 9,971,754, which was filed as application Ser. No. 15/006,833 on Jan. 26, 2016, which* is a Continuation of U.S. patent application Ser. No. 13/548,669, filed Jul. 13, 2012, *now U.S. Pat. No. 9,268,758,* which also claims the benefit of U.S. Provisional Application Ser. No. 61/507,910 filed Jul. 14, 2011, the contents of which applications are incorporated by reference.

FIELD OF THE INVENTION

The present disclosure relates to methods and systems for electronic signatures and, more particularly, to methods and systems for associating third-party content with online electronic document signing.

BRIEF DESCRIPTION OF THE DRAWINGS

Preferred and alternative examples of the present invention are described in detail below with reference to the following drawings.

DETAILED DESCRIPTION

Embodiments described herein provide enhanced computer- and network-based methods and systems for dynamic signature documents. Example embodiments provide an electronic signature service ("ESS") configured to facilitate the creation, storage, and management of documents and corresponding electronic signatures. Using the ESS, a first user (a "sender") can provide or upload a document to be signed ("a signature document"), while a second user (a "signer") can access, review, and sign the uploaded document.

Some embodiments of the ESS support dynamic signature documents. In one embodiment, a dynamic signature document includes or is associated with at least one dynamic form field that is mapped to an associated data store. When a dynamic signature document is accessed by a signer, its dynamic form fields are automatically populated with data obtained from the associated data store. Similarly, if the signer makes any changes to a dynamic form field, the changed data may be automatically propagated (e.g., written back, transmitted, recorded, stored) back to the associated data store. For example, suppose a document includes a dynamic form field representing a current telephone number of a signer. This field may be mapped to an associated data store, such as a database that includes customer data. Then, when a signer accesses the document, the field will be automatically populated with a current telephone number of the signer obtained from the database. And if the signer, in the course of reviewing and signing the document, changes or updates his current telephone number, the changed telephone number will be propagated back to the database.

Figure 1:
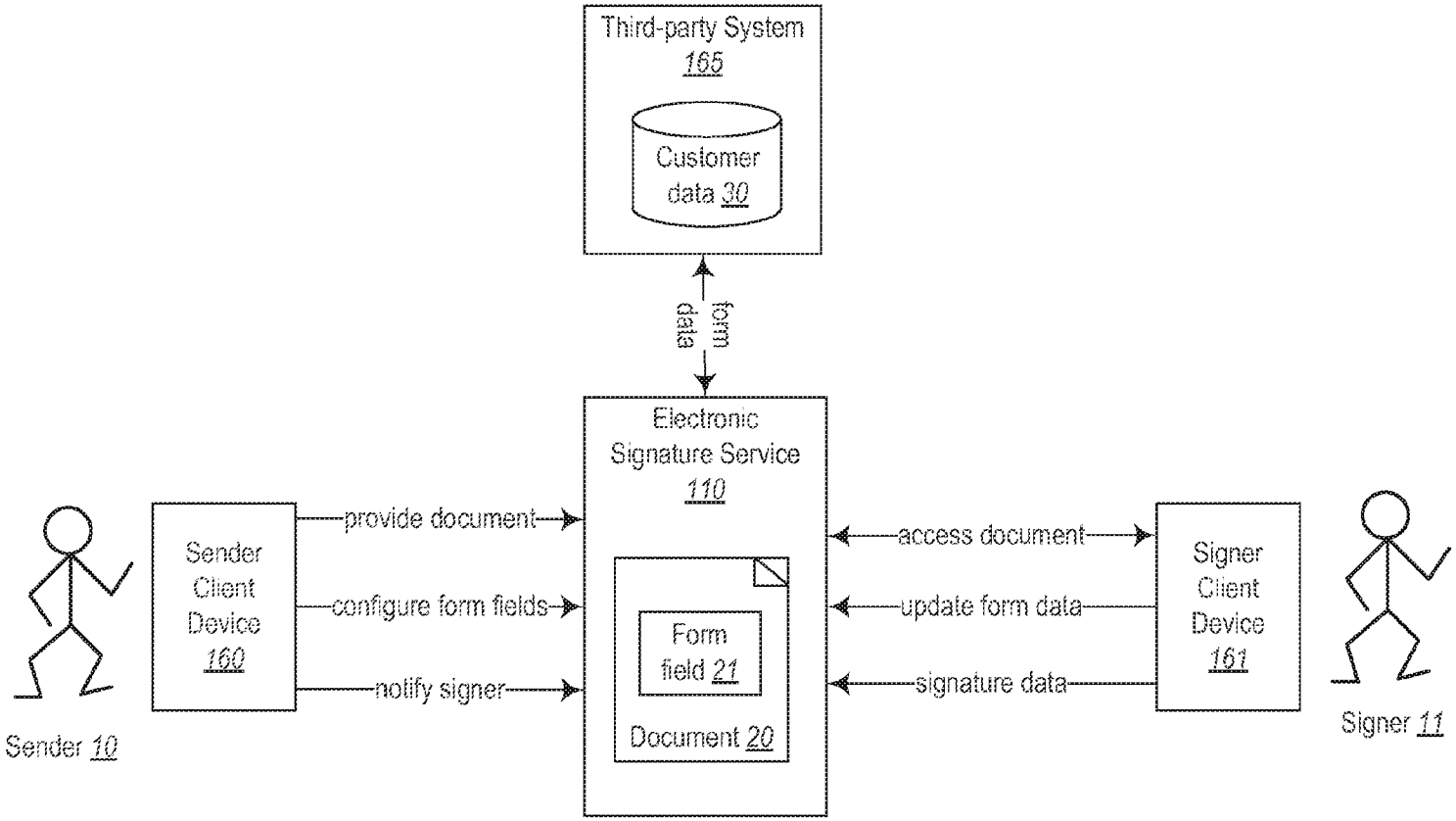
FIG. 1 illustrates an example block diagram of an example embodiment of an electronic signature service.

FIG. 1 illustrates an example block diagram of an example embodiment of an electronic signature service. In particular, FIG. 1 depicts an electronic signature service 110 utilized by a sender user 10 and a signer user 20 to perform an electronic signing of a dynamic signature document.

In the illustrated scenario, the sender 10 operates a sender client device 160 in order to provide (e.g., upload, transmit) an electronic document 20 (e.g., a contract, sales order, or agreement) to the ESS 110, where it is securely stored. The electronic document includes a field 21 that is configured to include data for the document 20, such as contact information, item descriptions, quantity, date, party name, or the like. The sender 10 may configure the field 21 by associating or mapping the field to a data store, such as customer data 30 hosted by a third-party system 165. In one embodiment, the third-party system 165 is a customer relationship management ("CRM") system that is used to store and manage information used in the sales context, including customer contact information, sales history, account information, and the like.

After configuring the form field, the sender notifies the signer 11. In some embodiments, the sender 10 causes the ESS 110 to send to the signer 11 a message (e.g., an email) that includes a reference (e.g., a URL) to the document 20 stored and maintained by the ESS 110. Upon receiving the message, the signer 11 operates a Web browser or other client module executing on the signer client device 161 to access and review the document 20 via the ESS 110. When the signer 11 accesses the document 20, the ESS 110 automatically obtains form data (e.g., a current telephone number for the signer 11) from customer data 30 in the third-party system 165, and inserts the obtained form data into the field 21.

During review, the signer 11 may update form data, such as by changing a telephone number or other item stored in the field 21. When the document has been modified to the satisfaction of the signer 11, the signer attaches (or provides an indication or instruction to attach) his electronic signature to the document 20. Once the signing has been completed, the ESS 110 writes back any form data changed by the signer 11 during the course of the signing. For example, if the signer 11 updated his current telephone number in field 21, the ESS 110 will write back the changed data to the third-party system 165, where it is stored in customer data 30.

Figure 2A:
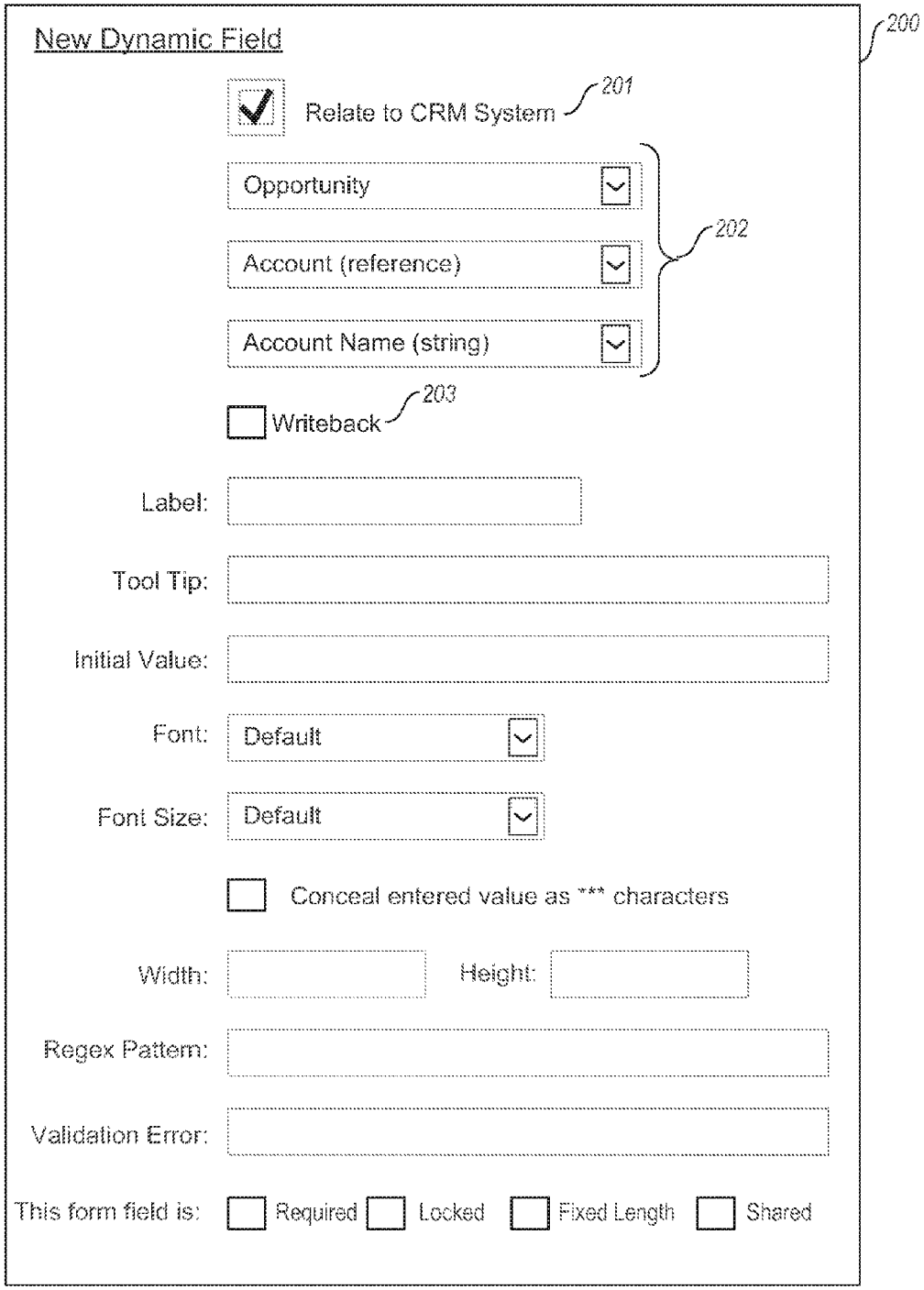
FIGS. 2A and 2B illustrate user interface aspects according to an example embodiment.
Figure 2B:
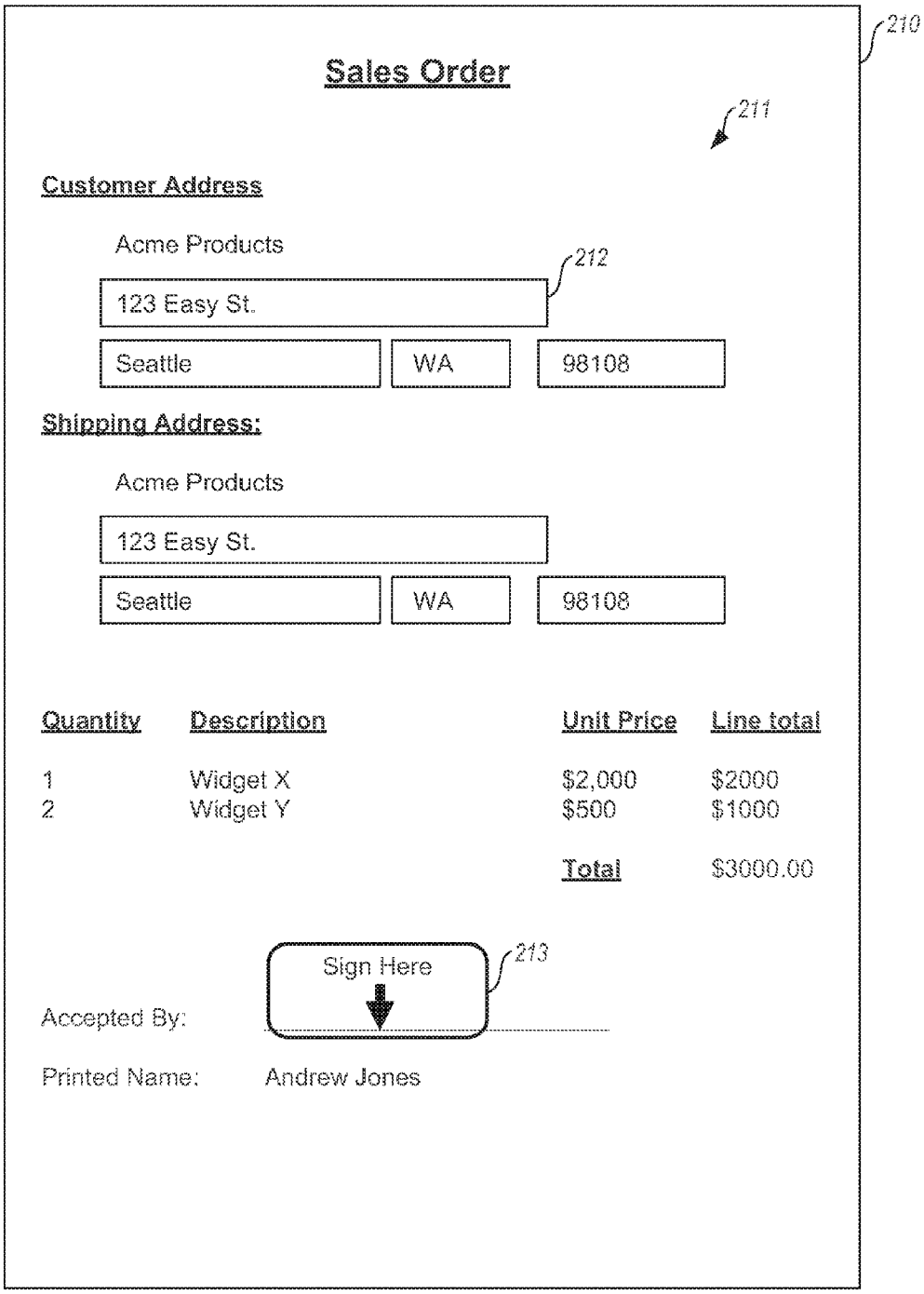

FIGS. 2A and 2B illustrate user interface aspects according to an example embodiment. FIG. 2A illustrates a dynamic form field management screen 200. The screen 200 includes controls that are configured to create, edit, modify, or otherwise manage a dynamic form field. The screen 200 may be part of a user interface provided by an example embodiment of the ESS 110. For example, the ESS 110 may provide an administrative user interface configured to facilitate the creation and management of dynamic form fields. In one embodiment, the screen 200 may be displayed (e.g., as a Web page) via a Web browser or other client application on the sender client device 160 so that the sender 10 can create the form field 21 for inclusion with the document 20, as described with respect to FIG. 1.

The illustrated screen 200 includes a dynamic field selection control 201, data store access parameter controls 202, and a write back control 203. By selecting (e.g., checking) the dynamic field selection control 201, a user may indicate that the present field is a dynamic form field that is associated with a data store. The user may then further provide access parameters via the parameter controls 202. For example, the user may provide the name of a corresponding data field or object (e.g., "Opportunity") in the data store, an account reference, and an account name. Other parameters may include access credentials (e.g., username and password), data type specification (e.g., number, text, telephone number), and the like.

In addition, the user may initiate write back functionality with respect to the present dynamic form field via the write back control 203. By selecting the control 203, the dynamic form field will write back (or cause to be written back) any changes to the form field made during a signature process.

Other properties or features of the dynamic form field may also be specified via the screen 200. For example, the user may provide, indicate, or specify a label, a tool tip (e.g., text to display upon a mouse over), an initial or default value, font details, field width and height, a regular expression pattern to which the form data must match, and a validation error message to display if entered form data does not match the regular expression pattern. In other embodiments, dynamic form fields may have additional, other, or fewer properties or features than those illustrated here.

In one embodiment, the dynamic form field of screen 200 may be automatically created by the ESS 110. For example, the ESS 110 may access a database schema or other metadata that describes the contents of the data store 30. Based on data objects or records defined by the schema, the ESS 110 may automatically generate one or more dynamic form fields. For example, if the schema defines a customer address record (e.g., including a street address, a city, a state, and a postal code), the ESS 110 may generate a customer address dynamic form field that may be further manually modified via the screen 200 and/or included in signature documents managed by the ESS 110.

FIG. 2B illustrates a document signature screen 210. The screen 210 may be part of a user interface provided by an example embodiment of the ESS 110. For example, the ESS 110 may provide a signer user interface configured to facilitate the review and signature of signature documents that may include dynamic form fields. In one embodiment, the screen 210 may be displayed (e.g., as a rendered Web page) via a Web browser or other client application on the signer client device 161 so that the signer 11 can review and sign the document 20, as described with respect to FIG. 1.

The screen 210 displays a representation of a signature document 211 as well as associated controls for reviewing, modifying, and signing the document. The representation of the signature document 211 may be or include one or more images of the document 20. In this example, the document 20 is a sales order, and its representation 211 displays details of the order, including addresses, order items, and a signature block.

The screen 210 includes at least one dynamic form field control 212 and a signature control 213. When the screen 210 is prepared by the ESS 110, the dynamic form field control 212 is populated with data. In this example, the control 212 is based on field 21 and associated with a customer address that is obtained from the customer data 30. The signer 11 may review and possibly modify the customer address as well as other form elements (e.g., shipping address).

Once the signer 11 is satisfied with his review, the signer may activate the signature control 213 to provide his electronic signature or otherwise manifest his assent to the terms of the agreement represented by the displayed document. As discussed above, once the document is signed, the contents of the control 212 (if modified) may be written back to the customer data store 30. Note that the contents of the control 212 may be written back upon the occurrence of other events, such as when the signer 11 saves the document for later signature, when the signer 11 forwards the document to other parties, upon the passage of a time interval (e.g., auto save), or the like.

Figure 3:
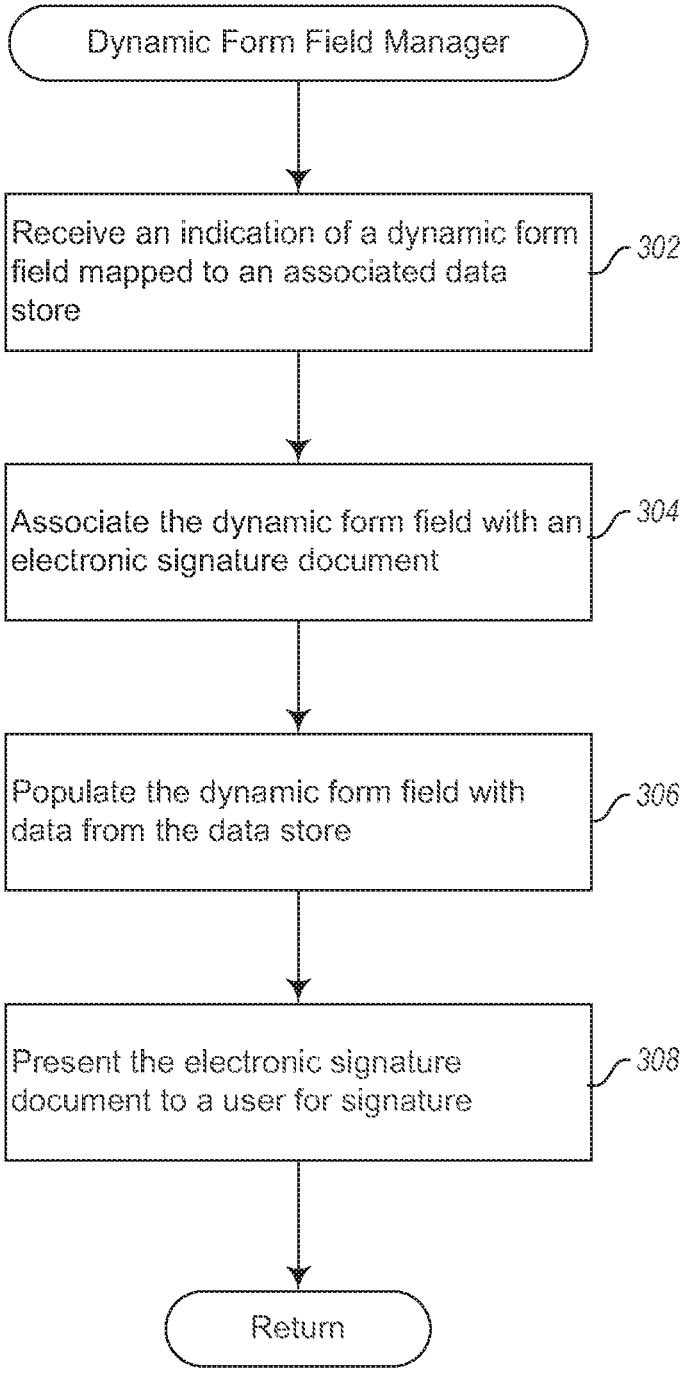
FIG. 3 is a flow diagram of an example dynamic form management process.

FIG. 3 is a flow diagram of an example dynamic form management process. The illustrated process may be performed by one or more modules of the ESS 110 described herein. Other embodiments may perform fewer or additional operations than those illustrated here.

The process begins at block 302, where it receives an indication of a dynamic form field mapped to an associated data store. Receiving the indication of the dynamic form field may include receiving a selection of the form field via an user interface configured to prepare electronic documents for signature. For example, a user may select (e.g., drag and drop) a dynamic form field from a menu of form fields for inclusion with an electronic signature document.

At block 304, the process associates the dynamic form field with an electronic signature document. Associating the dynamic form field may include embedding or incorporating the form field (or a copy thereof) into the signature document. In other embodiments, associating the dynamic form field may include adding to the signature document a link or reference to the form field. The form field itself may be represented as some combination of instructions and/or data that is configured to perform or cause to be performed the functions associated with the form field, such as fetching and/or writing back form data, displaying its contents, responding to user input events, and the like.

At block 306, the process populates the dynamic form field with data from the data store. Populating the form field with data may include interacting with the data store to obtain the appropriate data, as specified by the dynamic form field. For example, the form field may specify a query to execute against a database, the query configured to return a particular data item (e.g., customer address). Having obtained the data item from the data store, the process stores the data item in association with the form field. In some embodiments, the process populates the dynamic form field "on demand," that is, in response to a request to access, view, and/or sign the electronic signature document. In this manner, the form field will contain the most recent and up-to-date information from the data store. In other embodiments, the process may instead or also pre-fetch data for the dynamic form field, so that the form field will contain some information from the data store, even if the data store is inaccessible at a later time, such as when a user initiates a signature process.

At block 308, the process presents the electronic signature document to a user for signature. Presenting the electronic signature document may include transmitting the signature document or some representation thereof (e.g., page images) to a client device, where it will be rendered or displayed to a signer. When the signature document is displayed on the client device, the dynamic form field and associated data will also be displayed.

The process may perform additional operations in other embodiments. For example, the process may write back data from the dynamic form field which has been modified by the user. As another example, the process may automatically generate one or more dynamic form fields based on a database scheme associated with the data store.

Figure 4:
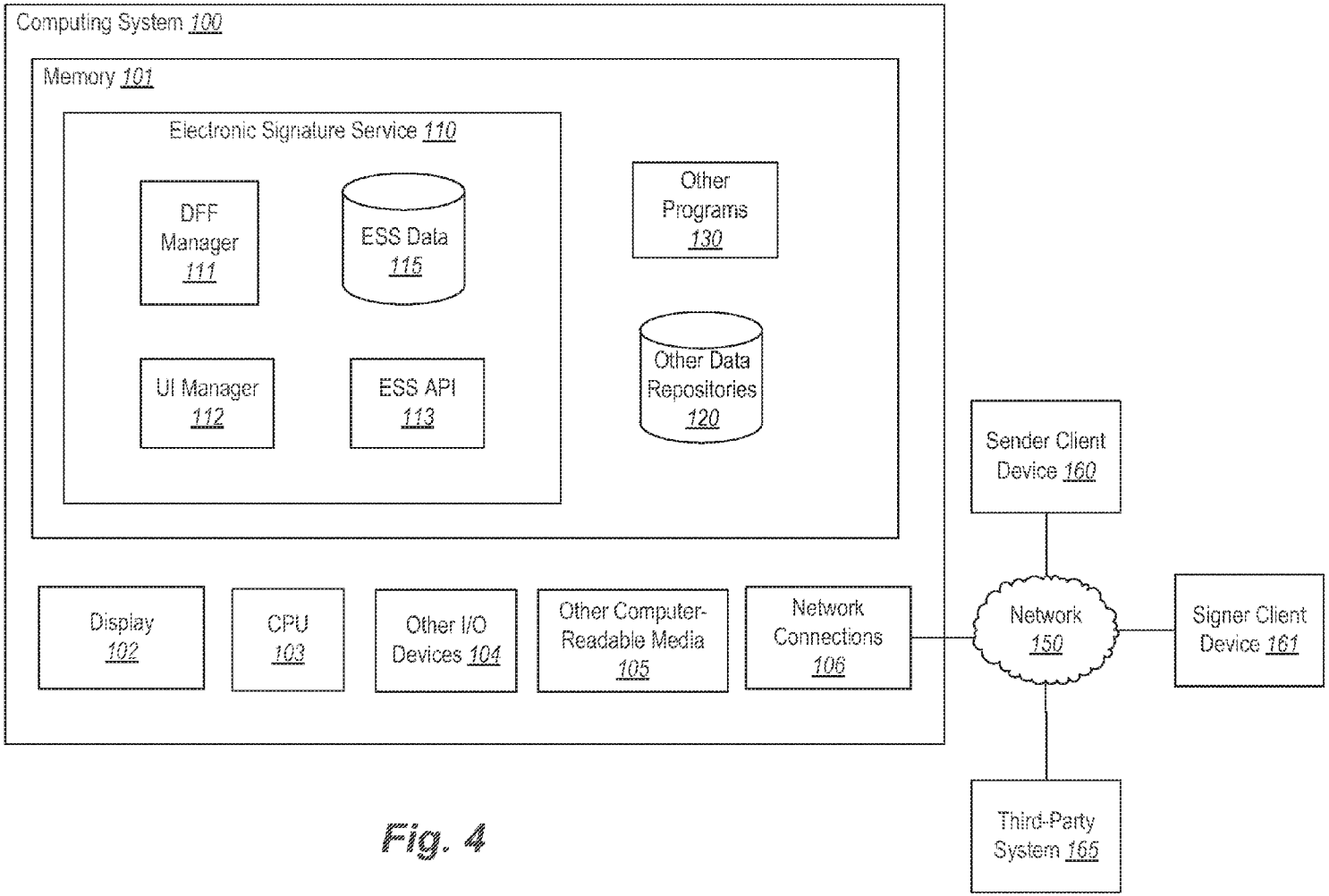
FIG. 4 is a block diagram of an example computing system for implementing an electronic signature service according to an example embodiment.

FIG. 4 is a block diagram of an example computing system for implementing an electronic signature service according to an example embodiment. In particular, FIG. 4 shows a computing system 100 that may be utilized to implement an electronic signature service 110.

Note that one or more general purpose or special purpose computing systems/devices may be used to implement the electronic signature service 110. In addition, the computing system 100 may comprise one or more distinct computing systems/devices and may span distributed locations. Furthermore, each block shown may represent one or more such blocks as appropriate to a specific embodiment or may be combined with other blocks. Also, the electronic signature service 110 may be implemented in software, hardware, firmware, or in some combination to achieve the capabilities described herein.

In the embodiment shown, computing system 100 comprises a computer memory ("memory") 101, a display 102, one or more Central Processing Units ("CPU") 103, Input/Output devices 104 (e.g., keyboard, mouse, CRT or LCD display, and the like), other computer-readable media 105, and network connections 106 connected to a network 150. The electronic signature service 110 is shown residing in memory 101. In other embodiments, some portion of the contents, some or all of the components of the electronic signature service 110 may be stored on and/or transmitted over the other computer-readable media 105. The components of the electronic signature service 110 preferably execute on one or more CPUs 103 and manage electronic signature processes and dynamic signature documents as described herein. Other code or programs 130 (e.g., an administrative interface, a Web server, and the like) and potentially other data repositories, such as data repository 120, also reside in the memory 101, and preferably execute on one or more CPUs 103. Of note, one or more of the components in FIG. 4 may not be present in any specific implementation. For example, some embodiments may not provide other computer readable media 105 or a display 102.

The electronic signature service 110 includes a dynamic form field ("DFF") manager 111, a user interface ("UI") manager 112, an electronic signature service application program interface ("API") 113, and an electronic signature service data store 115.

The ESS 110 generally performs electronic signature-related functions for or on behalf of users operating a sender client device 160 and/or a signer client device 161. In one embodiment, a sender operating the sender client device 160 provides (e.g., transmits, uploads, sends) a document to be electronically signed to the ESS 110. The ESS stores the document securely in data store 115. Secure document storage may include using cryptographic techniques to detect document tampering, such as generating hashes, message digests, or the like. A signer operating the signer client device 161 then accesses, reviews, and signs the document stored by the ESS 110. In some embodiments, the ESS 110 transmits images or some other representation of the document to the signer client device 161, which in turn transmits an indication of the signer's signature (or intent to sign) to the ESS 110. The ESS 110 then securely stores the signer's signature in association with the document in the data store 115.

The DFF manager 111 performs dynamic form field-related functions. For example, the signer operating signer client device 161 may interact (directly or indirectly) with the DFF manager 111 to configure a dynamic form field by specifying that data for the form field be obtained from a local or remote data store, such as data repository 120 or a data store hosted by or accessed via the third-party system 165. In addition, when a dynamic signature document is accessed by a signer (or in response to other events), the DFF manager 111 may populate its dynamic form fields using data obtained from the specified data store. Furthermore, the DFF manager 111 may, upon signature (or in response to other events) write back or propagate data from dynamic form fields that have been updated by the signer.

The UI manager 112 provides a view and a controller that facilitate user interaction with the electronic signature service 110 and its various components. For example, the UI manager 112 may provide interactive access to the electronic signature service 110, such that users can upload or download documents for signature, create and/or configure dynamic form fields associated with or incorporated into signature documents, and the like. In some embodiments, access to the functionality of the UI manager 112 may be provided via a Web server, possibly executing as one of the other programs 130. In such embodiments, a user operating a Web browser (or other client) executing on one of the client devices 160 or 161 can interact with the electronic signature service 110 via the UI manager 112.

In one embodiment, the UI manager 112 or related components are adapted to automatically configure a user interface to facilitate the generation of dynamic signature documents. For example, the UI manager 112 may interrogate or otherwise interact with a data store (e.g., a customer relationship management data store hosted by the system 165) to determine or identify a schema or other structure that describes data objects or other contents of the data store. Then, based on the identified schema, the UI manager may automatically construct or generate a collection (e.g., a palette) of dynamic form fields that are mapped to associated data objects in the data store. This collection can then be presented to a user, who can then manipulate (e.g., drag and drop) the dynamic form fields in order to associate them with signature documents, thereby creating dynamic signature documents.

The API 113 provides programmatic access to one or more functions of the electronic signature service 110. For example, the API 113 may provide a programmatic interface to one or more functions of the electronic signature service 110 that may be invoked by one of the other programs 130 or some other module. In this manner, the API 113 facilitates the development of third-party software, such as user interfaces, plug-ins, news feeds, adapters (e.g., for integrating functions of the electronic signature service 110 into Web applications), and the like. In addition, the API 113 may be in at least some embodiments invoked or otherwise accessed via remote entities, such as the third-party system 165, to access various functions of the electronic signature service 110. For example, a customer relationship management service executing on the system 165 may provide, configure, or otherwise interact with dynamic signature documents managed by the ESS 110 via the API 113.

The data store 115 is used by the other modules of the electronic signature service 110 to store and/or communicate information. The components of the ESS 110 use the data store 115 to record various types of information, including documents, signatures, dynamic form fields and related data, and the like. Although the components of the ESS 110 are described as communicating primarily through the data store 115, other communication mechanisms are contemplated, including message passing, function calls, pipes, sockets, shared memory, and the like.

The electronic signature service 110 interacts via the network 150 with client devices 160 and 161, and third-party systems 165. The network 150 may be any combination of one or more media (e.g., twisted pair, coaxial, fiber optic, radio frequency), hardware (e.g., routers, switches, repeaters, transceivers), and one or more protocols (e.g., TCP/IP, UDP, Ethernet, Wi-Fi, WiMAX) that facilitate communication between remotely situated humans and/or devices. In some embodiments, the network 150 may be or include multiple distinct communication channels or mechanisms (e.g., cable-based and wireless). The client devices 160 and 161 include personal computers, laptop computers, smart phones, personal digital assistants, tablet computers, and the like.

In an example embodiment, components/modules of the electronic signature service 110 are implemented using standard programming techniques. For example, the electronic signature service 110 may be implemented as a "native" executable running on the CPU 103, along with one or more static or dynamic libraries. In other embodiments, the electronic signature service 110 may be implemented as instructions processed by a virtual machine that executes as one of the other programs 130. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the electronic signature service 110, such as in the data store 115 and/or 120, can be available by standard mechanisms such as through C, C++, C#, and Java APIs; libraries for accessing files, databases, or other data repositories; through scripting languages such as XML; or through Web servers, FTP servers, or other types of servers providing access to stored data. The illustrated data stores may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the electronic signature service 110 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "includes," "including," "comprises," and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A computing system configured to facilitate management of electronic signature documents, the computing system comprising:

one or more processors;

one or more memory devices; and a module executable via the one or more processors using instructions stored by the one or more memory devices, to perform operations including:

receiving an electronic document and configuration data for the electronic document from *a first device associated with* a first user[via a user interface of an electronic document transaction service], the configuration data including one or more dynamic form fields comprising unpopulated fields of the electronic document, the one or more dynamic form fields mapped to an associated external data store; and in response to a request to [access] *view* the electronic document from *a second device associated with* a second user[,]*:* automatically populating the one or more dynamic form fields with current data associated with the second user obtained from the associated external data store[;]*, wherein the automatically populating the one or more dynamic form fields further includes receiving access credentials associated with the external data store and obtaining the current data associated with the second user from the external data store using the received access credentials, and*

[in response to populating the one or more dynamic form fields, presenting] *displaying* the electronic document [including] *and* the one or more dynamic form fields populated with the current user data associated with the second user *at a same time* to the second user for signature; and receiving an indication of the second user applying an electronic signature to the electronic document.

[2. The computing system of claim 1, wherein the module is further configured to perform operations including in response to receiving the indication of the second user applying the electronic signature determining whether the second user updated any of the user data in the one or more dynamic form fields; and in response to determining that the second user updated at least a portion of the user data, transmitting data from the one ore more dynamic form fields updated by the second user back to the external data store.]

[3. The computing system of claim 1, wherein the module is further configured to perform operations including:

receiving access credentials associated with the external data store; and obtaining the current user data associated with the second user from the external data store using the received access credentials.]

[4. The computing system of claim 1, wherein presenting the electronic document to the second user includes transmitting an image representative of a portion of the electronic document along with a module that represents the one or more dynamic form fields and that is configured to receive input data from the second user and to transmit the received input data to the computing system.]

[5. The computing system of claim 1, wherein the module is further configured to perform operations including:

identifying a schema associated with the external data store associating one or more additional dynamic form fields with the one or more dynamic form fields of the electronic document configuration data received from the first user;

automatically populating the one or more additional dynamic form fields with the current user data associated with the second user obtained from the associated external data store; and presenting the electronic document including the one or more additional dynamic form fields populated with the current user data associated with the second user to the second user for signature.]

[6. The computing system of claim 1, wherein the configuration data for the electronic document received from the first user comprises a specification of data types for the one or more dynamic form fields mapped to the associated data store that provides data values for the one or more dynamic form fields.]

[7. The computing system of claim 1, wherein presenting the electronic signature document to the second user includes transmitting an image of a portion of the electronic signature document along with a signature control to receive the indication of the second user applying the electronic signature to the electronic document.]

[8. A method configured to facilitate management of electronic signature documents, the method comprising:

receiving, using one or more processors executing within a computing device, an electronic document and configuration data for the electronic document from a first user via a user interface of an electronic document transaction service, the configuration data including one or more dynamic form fields comprising unpopulated fields of the electronic document, the one or more dynamic form fields mapped to an associated external data store; and in response to receiving a request to access the electronic document from a second user, automatically populating the one or more dynamic form fields with current data associated with the second user obtained from the associated external data store;

in response to populating the one or more dynamic form fields, presenting the electronic document including the one or more dynamic form fields populated with the current user data associated with the second user to the second user for signature; and receiving an indication of the second user applying an electronic signature to the electronic document.]

[9. The method of claim 8, further comprising:

in response to receiving the indication of the second user applying the electronic signature determining whether the second user updated any of the user data in the one or more dynamic form fields; and in response to determining that the second user updated at least a portion of the user data, transmitting data from the one ore more dynamic form fields updated by the second user back to the external data store.]

[10. The method of claim 8, wherein the automatically populating the one or more dynamic form fields further includes:

receiving access credentials associated with the external data store; and obtaining the current user data associated with the second user from the external data store using the received access credentials.]

[11. The method of claim 8, wherein presenting the electronic document to the second user includes transmitting an image representative of a portion of the electronic document along with a module that represents the one or more dynamic form fields and that is configured to receive input data from the second user and to transmit the received input data to the computing system.]

[12. The method of claim 8, further comprising:

identifying a schema associated with the external data store associating one or more additional dynamic form fields with the one or more dynamic form fields of the electronic document configuration data received from the first user;

automatically populating the one or more additional dynamic form fields with the current user data associated with the second user obtained from the associated external data store; and presenting the electronic document including the one or more additional dynamic form fields populated with the current user data associated with the second user to the second user for signature.]

[13. The method of claim 8, wherein presenting the electronic signature document to the second user includes transmitting an image of a portion of the electronic signature document along with a signature control to receive the indication of the second user applying the electronic signature to the electronic document.]

[14. A non-transitory computer readable storage medium including instructions that, when executed on one or more processors within a computing device, cause the computing device to perform operations including:

receiving, using one or more processors executing within a computing device, an electronic document and configuration data for the electronic document from a first user via a user interface of an electronic document transaction service, the configuration data including one or more dynamic form fields comprising unpopulated fields of the electronic document, the one or more dynamic form fields mapped to an associated external data store; and in response to receiving a request to access the electronic document from a second user, automatically populating the one or more dynamic form fields with current data associated with the second user obtained from the associated external data store;

in response to populating the one or more dynamic form fields, presenting the electronic document including the one or more dynamic form fields populated with the current user data associated with the second user to the second user for signature; and receiving an indication of the second user applying an electronic signature to the electronic document.]

[15. The computer readable storage medium of claim 14, wherein the instruction further include instructions to perform operations comprising:

in response to receiving the indication of the second user applying the electronic signature determining whether the second user updated any of the user data in the one or more dynamic form fields; and in response to determining that the second user updated at least a portion of the user data, transmitting data from the one ore more dynamic form fields updated by the second user back to the external data store.]

[16. The computer readable storage medium of claim 14, wherein the instructions for automatically populating the one or more dynamic form fields further include instructions for:

receiving access credentials associated with the external data store; and obtaining the current user data associated with the second user from the external data store using the received access credentials.]

[17. The computer readable storage medium of claim 14, wherein presenting the electronic document to the second user includes transmitting an image representative of a portion of the electronic document along with a module that represents the one or more dynamic form fields and that is configured to receive input data from the second user and to transmit the received input data to the computing system.]

[18. The computer readable storage medium of claim 14, wherein the instruction further include instructions to perform operations comprising:

identifying a schema associated with the external data store associating one or more additional dynamic form fields with the one or more dynamic form fields of the electronic document configuration data received from the first user;

automatically populating the one or more additional dynamic form fields with the current user data associated with the second user obtained from the associated external data store; and presenting the electronic document including the one or more additional dynamic form fields populated with the current user data associated with the second user to the second user for signature.]

[19. The computer readable storage medium of claim 14, wherein presenting the electronic signature document to the second user includes transmitting an image of a portion of the electronic signature document along with a signature control to receive the indication of the second user applying the electronic signature to the electronic document.]

[20. The computer readable storage medium system of claim 14, wherein the configuration data for the electronic document received from the first user comprises a specification of data types for the one or more dynamic form fields mapped to the associated data store that provides data values for the one or more dynamic form fields.]

*21. A method comprising:*

*receiving, using one or more processors executing within a computing device, an electronic document and configuration data for the electronic document from a first device associated with a first user, the configuration data including one or more dynamic form fields each mapped to an associated external data store; and*

*in response to receiving a request to view the electronic document a second device associated with a second user:*

*automatically populating the one or more dynamic form fields with current data associated with the second user obtained from the associated external data store, wherein the automatically populating the one or more dynamic form fields further includes receiving access credentials associated with the external data store and obtaining the current data associated with the second user from the external data store using the received access credentials, and*

*displaying the electronic document and the one or more dynamic form fields populated with the current data associated with the second user at a same time to the second user for signature.*

*22. The method of claim 21, wherein displaying the electronic document to the second user includes transmitting an image representative of a portion of the electronic document along with a module that represents the one or*

*more dynamic form fields and that is configured to receive input data from the second user and to transmit the received input data to the computing system.*

*23. The method of claim 21, wherein displaying the electronic document to the second user includes transmitting an image of a portion of the electronic document along with a signature control to receive an indication of the second user applying an electronic signature to the electronic document.*

*24. A method comprising:*

*receiving, using one or more processors executing within a computing device, an electronic document and configuration data for the electronic document from a first device associated with a first user, the configuration data including one or more dynamic form fields each mapped to an associated external data store;*

*in response to receiving a request to view the electronic document from a second device associated with a second user:*

*automatically populating the one or more dynamic form fields with current data associated with the second user obtained from the associated external data store; and*

*displaying the electronic document and the one or more dynamic form fields populated with the current user data associated with the second user at a same time to the second user for signature;*

*in response to receiving an indication of the second user applying an electronic signature, determining whether the second device updated any of the user data in the one or more dynamic form fields; and*

*in response to determining that the second device updated at least a portion of the user data, transmitting data from the one or more dynamic form fields updated by the second device back to the external data store.*

*25. A method comprising:*

*receiving, using one or more processors executing within a computing device, an electronic document and configuration data for the electronic document from a first device associated with a first user, the configuration data including one or more dynamic form fields each mapped to an associated external data store;*

*in response to receiving a request to view the electronic document from a second device associated with a second user:*

*automatically populating the one or more dynamic form fields with current data associated with a second user obtained from the associated external data store:*

*displaying the electronic document and the one or more dynamic form fields populated with the current data associated with the second user at a same time to the second user for signature;*

*identifying a schema associated with the external data store associating one or more additional dynamic form fields with the one or more dynamic form fields of the configuration data received from the first device;*

*automatically populating the one or more additional dynamic form fields with the current data associated with the second user obtained from the associated external data store; and*

*presenting the electronic document including the one or more additional dynamic form fields populated with the current data associated with the second user to the second user for signature.*

*26. A non-transitory computer readable storage medium including instructions that, when executed on one or more processors within a computing device, cause the computing device to perform operations including:*

*receiving, using one or more processors executing within a computing device, an electronic document and configuration data for the electronic document from a first device associated with a first user, the configuration data including one or more dynamic form fields each mapped to an associated external data store; and*

*in response to receiving a request to view the electronic document from a second device associated with a second user:*

*automatically populating the one or more dynamic form fields with current data associated with a second user obtained from the associated external data store, wherein the instructions for automatically populating the one or more dynamic form fields further include instructions for receiving access credentials associated with the external data store and obtaining the current data associated with the second user from the external data store using the received access credentials, and*

*displaying the electronic document and the one or more dynamic form fields populated with the current user data associated with the second user at a same time to the second user for signature.*

*27. The non-transitory computer readable storage medium of claim 26, wherein the instructions further include instructions to perform operations comprising:*

*in response to receiving an indication of the second user applying an electronic signature, determining whether the second device updated any of the user data in the one or more dynamic form fields; and*

*in response to determining that the second device updated at least a portion of the user data, transmitting data from the one or more dynamic form fields updated by the second device back to the external data store.*

*28. The non-transitory computer readable storage medium of claim 26, wherein displaying the electronic document to the second user includes transmitting an image representative of a portion of the electronic document along with a module that represents the one or more dynamic form fields and that is configured to receive input data from the second user and to transmit the received input data to the computing system.*

*29. The non-transitory computer readable storage medium of claim 26, wherein the instructions further include instructions to perform operations comprising:*

*identifying a schema associated with the external data store associating one or more additional dynamic form fields with the one or more dynamic form fields of the configuration data received from the first device;*

*automatically populating the one or more additional dynamic form fields with the current data associated with the second user obtained from the associated external data store; and*

*presenting the electronic document including the one or more additional dynamic form fields populated with the current data associated with the second user to the second user for signature.*

*30. The non-transitory computer readable storage medium of claim 26, wherein displaying the electronic document to the second user includes transmitting an image of a portion of the electronic document along with a signature control to receive an indication of the second user applying an electronic signature to the electronic document.*

*31. The non-transitory computer readable storage medium of claim 26, wherein the configuration data for the*

*electronic document received from the first device comprises a specification of data types for the one or more dynamic form fields mapped to the associated data store that provides data values for the one or more dynamic form fields.*

* * * * *